(12) United States Patent
Glanzmann

(10) Patent No.: US 6,536,128 B2
(45) Date of Patent: Mar. 25, 2003

(54) APPARATUS FOR THE POSITIONING OF MEASURING INSTRUMENTS

(75) Inventor: Kurt Glanzmann, Rueti (CH)

(73) Assignee: Heinrich Kuendig & Cie. AG, Rueti (CH)

(*) Notice: Subject to any disclaimer, the term of this patent is extended or adjusted under 35 U.S.C. 154(b) by 0 days.

(21) Appl. No.: 09/755,726

(22) Filed: Jan. 5, 2001

(65) Prior Publication Data
US 2001/0007173 A1 Jul. 12, 2001

(30) Foreign Application Priority Data
Jan. 10, 2000 (EP) .............................. 00810022

(51) Int. Cl.⁷ .............................. G01B 5/20; G01B 7/28
(52) U.S. Cl. .......................................... 33/553; 33/533
(58) Field of Search ...................... 33/549, 832, 833, 33/834, 501.02, 533, 551, 553, 554, 555

(56) References Cited

U.S. PATENT DOCUMENTS

| | | | | |
|---|---|---|---|---|
| 3,762,053 A | * | 10/1973 | Day ................................ | 33/533 |
| 4,693,012 A | * | 9/1987 | Cesna ............................. | 33/533 |
| 5,231,767 A | * | 8/1993 | Brinley .......................... | 33/522 |
| 5,617,645 A | * | 4/1997 | Wick et al. ..................... | 33/551 |
| 5,974,679 A | * | 11/1999 | Birang et al. .................. | 33/553 |
| 6,169,290 B1 | * | 1/2001 | Rosberg et al. ................ | 33/533 |

FOREIGN PATENT DOCUMENTS

| | | |
|---|---|---|
| DE | 4002884 A1 | 4/1991 |
| DE | 19632385 A1 | 3/1997 |
| DE | 19707781 A1 | 9/1998 |

OTHER PUBLICATIONS

Patent Abstracts of Japan, vol. 1999, No. 4, Apr. 30, 1999 & JP 11 003771 A (Mitsubishi Electric Corp), Jan. 6, 1999, Abstract.

* cited by examiner

*Primary Examiner*—Christopher W. Fulton
(74) *Attorney, Agent, or Firm*—Townsend and Townsend and Crew LLP

(57) ABSTRACT

The apparatus for the positioning of a measuring device has an annular or arcuate track to which a measuring device is attached. To position the sensing head of the measuring unit radially with respect to the material under test, a crossbeam is provided which supports the measuring device. Bearings are arranged between the track and the crossbeam. In the apparatus for positioning, the position of the crossbeam with the measuring device can be changed in a radial direction to the track with respect to the track.

17 Claims, 3 Drawing Sheets

APPARATUS FOR THE POSITIONING OF MEASURING INSTRUMENTS

BACKGROUND OF THE INVENTION

The invention relates to an apparatus for the positioning of measuring instruments.

Such apparatuses are used, for example, in the manufacture of plastic films to position measuring instruments with respect to the material under test for the determination and monitoring of the thickness of the plastic films. Plastic films are extruded, for example, as a tube. An arcuate or annular track is arranged around the tube of plastic film, as concentric as possible thereto, just after the extruder as seen in the direction of movement of the tube. The actual measuring unit with the measuring head and adjusting arm is arranged on this track. The adjusting arm with the measuring unit and the measuring head is radially movable, for example, in the case of a circular, annular track. It is thus possible to position the measuring head radially correctly with respect to the, for example, tubular material under test.

The sensing head of the measuring head monitors the thickness of a plastic film only over a width of a few millimeters or centimeters. As a rule, the thickness of plastic films does not change suddenly and by a great deal very quickly. Differences in the thickness of films are substantially more common over the periphery of a foil extruded as a tube. Differences can therefore predominantly be seen in the thickness transverse to the direction of movement of the extruded foil, in the so-called cross-profile. It is therefore sufficient in most cases to move the measuring head, for example, periodically over the periphery of the tube in order to determine deficiencies in the thickness of the plastic film. When the measuring head moves to and fro on the annular track, it is known, for example, as reversing.

This to-and-fro movement of the measuring device over the periphery of the tube or the orbital movement around the tube can be generated in a number of different ways. For example, a carriage can be arranged on the rail-like track and the measuring unit attached thereto. The carriage can be self-propelled or driven in another way such as by a revolving rope or belt. Flexible cables and sliding contacts such as rotor slip rings can be provided for the transmission of the measuring signals, control signals and/or the power supply of the measuring unit and the drive. The measuring signals and the control signals can also be transmitted in a wireless manner.

Prior apparatuses for measuring the thickness of plastic films, e.g. of extruded polyethylene films, are made such that the track is arranged concentrically around the film tube extruded from a blow head between the blow head and a winding device. The measuring unit travels around the moving film bubble on the track. The sensing head of the measuring unit is mounted on a radially movable arm and is thus positioned exactly with respect to the film. The positioning can be necessary with a precision in the range of millimeters or fractions of millimeters, especially, but not only, when the material under test should not have any contact with any part of the sensing head, i.e. when the measurement is to be made in a non-contact process. The arm can here effectively be movable as a whole; however, it can also be a telescopically extendable and retractable arm, i.e. an arm which can be moved forwards and backwards in a radial direction, on which the sensing head of the measuring unit is attached. A linear motor or a pneumatic linear adjustment device can also be suitable. Very fast and very fine positioning in a range of a few, e.g. approximately 4, centimeters is possible with a linear motor.

In a unit with which, for example, tubular films of different diameters should be monitored, the arm to which the sensing head is attached is moved to different distances. In order to ensure the required stability, the extension region of an arm built at a reasonable cost is limited to approximately 50 cm to 85 cm. As a result, the unit is limited to use with film tubes having diameters differing in the range from approximately one to two meters.

SUMMARY OF THE INVENTION

The apparatus of the present invention constitutes a substantial improvement over the prior art and has an annular or arcuate track to which a measuring device is attached. In order to position the sensing head radially with respect to the material under test, a crossbeam is provided which supports the measuring device. Bearings are arranged between the track and the crossbeam. In the apparatus for positioning, the position of the crossbeam with the measuring device can be changed in a radial direction to the track with respect to the track.

It is easily possible with the apparatus in accordance with the invention to substantially expand the working range of the unit and to ensure the mechanical stability. If a circular track has a diameter in the order of approximately six to seven meters, the working range of the measuring unit can easily be in the range of a number of meters. That is, film tubes with diameters, for example, of approximately one to eight meters can be monitored without the accuracy of the positioning suffering. With the new apparatus in accordance with the invention, it is therefore possible to position a measuring unit, and in particular the sensing head of this measuring unit, in a mechanically stable manner over a large range.

The invention is described in more detail below with reference to the schematic drawings.

DESCRIPTION OF THE PREFERRED EMBODIMENTS

Figure 1:
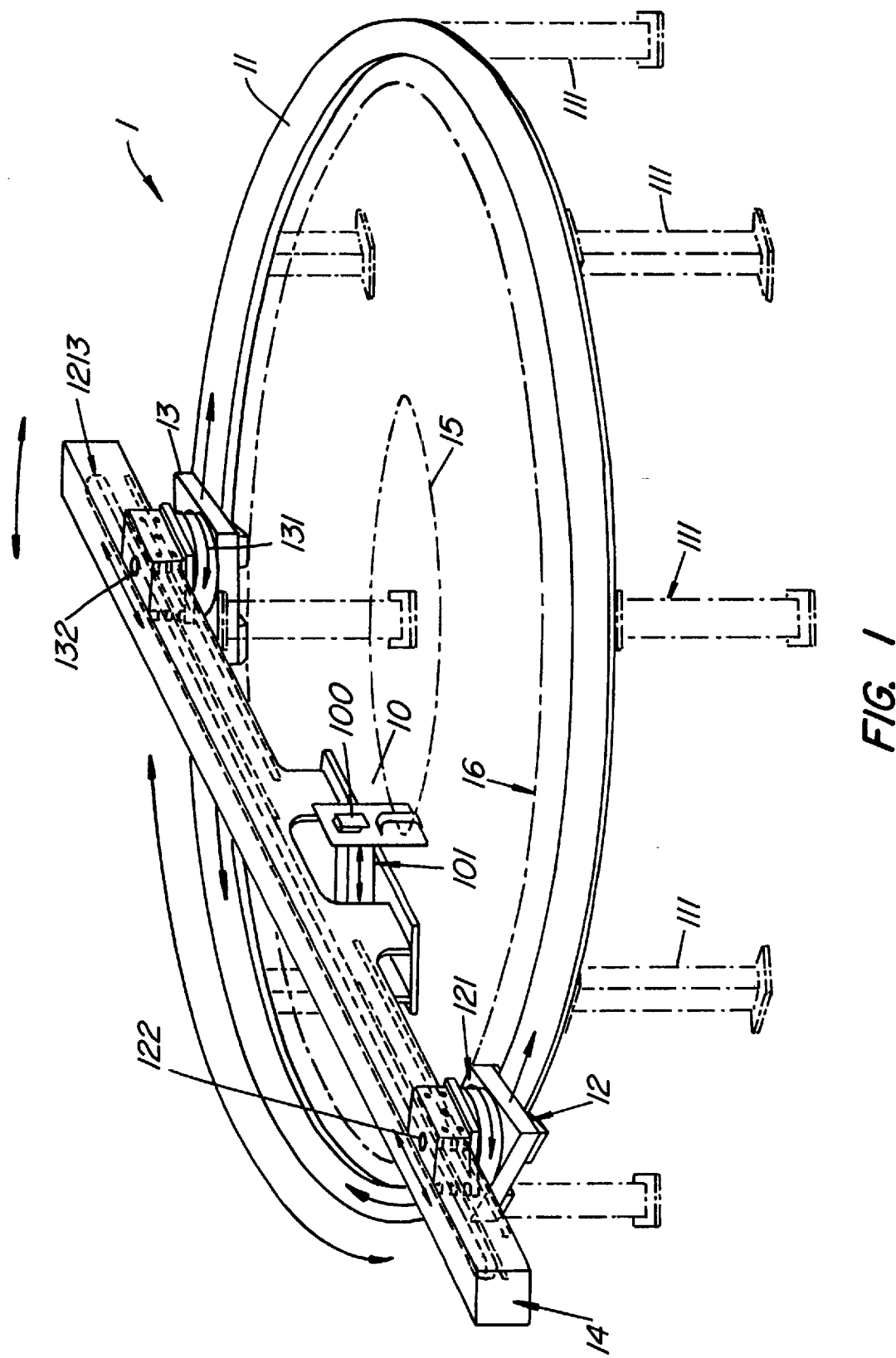
FIG. 1 is the schematic, perspective view of an apparatus for the positioning of a measuring instrument such as can be used for measuring the thickness of extruded tubular plastic films, the apparatus having a track and a kind of swivelling bolsters which support a crossbeam.

FIG. 1 shows an apparatus for the positioning 1 of a measuring unit 10 in accordance with the invention. Two carriages designed as swivelling bolsters 12, 13 are arranged on a circular track designed in annular segment shape. The track 11 is mounted on the rail supports 111. A crossbeam 14, with the measuring unit 10, is supported and journalled on the two swivelling bolsters 12, 13. One pivot bearing 121, 131 and one longitudinal bearing 122, 132, so-called travelling crabs, are present on each of the swivelling bolsters 12, 13. As a result, the position of the crossbeam 14 can be changed both lengthwise and angle wise with respect to the swivelling bolsters 12, 13, which is required and which allows the swivelling bolsters 12, 13 to be moved towards or away from one another on the track 11. The changing of the position of the crossbeam 14 also results in a change in the position of the measuring unit 10 and in particular the sensing head 100 of the measuring unit 10. The sensing head 100 is attached to an extendable and retractable telescopic arm 101 with which the fine positioning of the sensing head 100 is carried out with respect to the material under test.

The material under test can be a tube of extruded plastic film (not shown), for example of polyethylene, whose wall thickness is monitored with a sensing organ 100 with capacitance operation. Other measuring procedures are also known which work, for example, with ionizing radiation (gamma or beta radiation).

In the example shown, the position of the crossbeam 14 on the swivelling bolsters 12, 13 is adjusted mechanically using a so-called synchronizing belt 1213. The two swivelling bolsters 12, 13 are synchronized by this design, i.e. they can be moved towards and away from one another in the same way so that the position of the measuring unit 10 as seen on the respective chord always remains at its center. If the crossbeam 14 is moved radially outwardly or inwardly with respect to the track 11 and if the measuring unit 10 is positioned at the center of the chord formed by the crossbeam 14 with the track 11, the measuring unit 10 moves radially outwardly or inwardly in each case. For the apparatus shown in FIG. 1, the maximum inner and outer position of the sensing head 100 of the measuring unit 10 is illustrated by the two chain-dotted lines 15 (inner) and 16 (outer).

The blow head (not shown) of the extrusion plant is arranged concentrically to the track, for example, in the region of the base on which the apparatus for positioning 1 stands, or one or two stories further down. The film runs from the blow head, from bottom to top, and is blown up and cooled by air blown into the tube. Different blow heads are used for films of different sizes. Film blowing plants are generally several stories high. The thickness measuring device with the apparatus for positioning is usually located one to two stories higher than the extruder and the blow head. So-called multi-layer plants are also available where different materials are extruded from different extruders to different positions of the blow head. Multilayer films of different materials are produced with these plants.

The crossbeam 14 with the measuring unit 10 of the apparatus for positioning in a radial direction (radial arrows) is adjusted to the respective diameter of the bubble (not shown) by displacing the two swivelling bolsters 12 and 13 towards and away from one another (tangential arrows). The fine adjustment of the position of the sensing head 100 with respect to the material under test is effected, for example, with the arm 101. However, it is also possible to carry out the positioning with the crossbeam alone.

In operation, the swivelling bolsters 12, 13 run backwards and forwards or are continuously orbiting the material under test together with the crossbeam 14 on the track 11 of the apparatus for positioning 1. The two swivelling bolsters can utilize a common toothed belt for propulsion. The synchronization of the two swivelling bolsters is effected, for example, by both swivelling bolsters being driven by one stepping motor each, with the stepping motors being controlled with crystal precision from one control, but otherwise independently of one another. If the stepping motors of the two swivelling bolsters are controlled with exactly the same frequency and in the same direction, the swivelling bolsters and thus also the crossbeam mounted thereon move around the film bubble without their radial spacing (to the center of the circular orbit) changing.

The supply of the electric power can be effected via rotor slip rings, via live rails of the track 11, or also via movable cables. The measuring and control signals can, as already described, be transmitted in a wireless manner and/or modulated upon the feed on the power line. The extrusion plant can be influenced and so the thickness of the film corrected on the basis of the signals measured for the thickness of the film. This is done, for example, by influencing blowing air cooling elements or heating elements arranged over the periphery of the blow head. It can also be provided to displace elements of the blow head mechanically, for example to center them better or position them differently such that the thickness profile of the film is again as flat, i.e. smooth, as possible. The mean thickness of the film can, for example, also be influenced, i.e. altered, by changing the speed at which the film is drawn off.

The drive of one or both swivelling bolsters 12, 13 on the track 11 can be effected, for example, using one or more electric motors in one or both swivelling bosters, using a belt, a rope, using a linear drive or otherwise.

Figure 2:
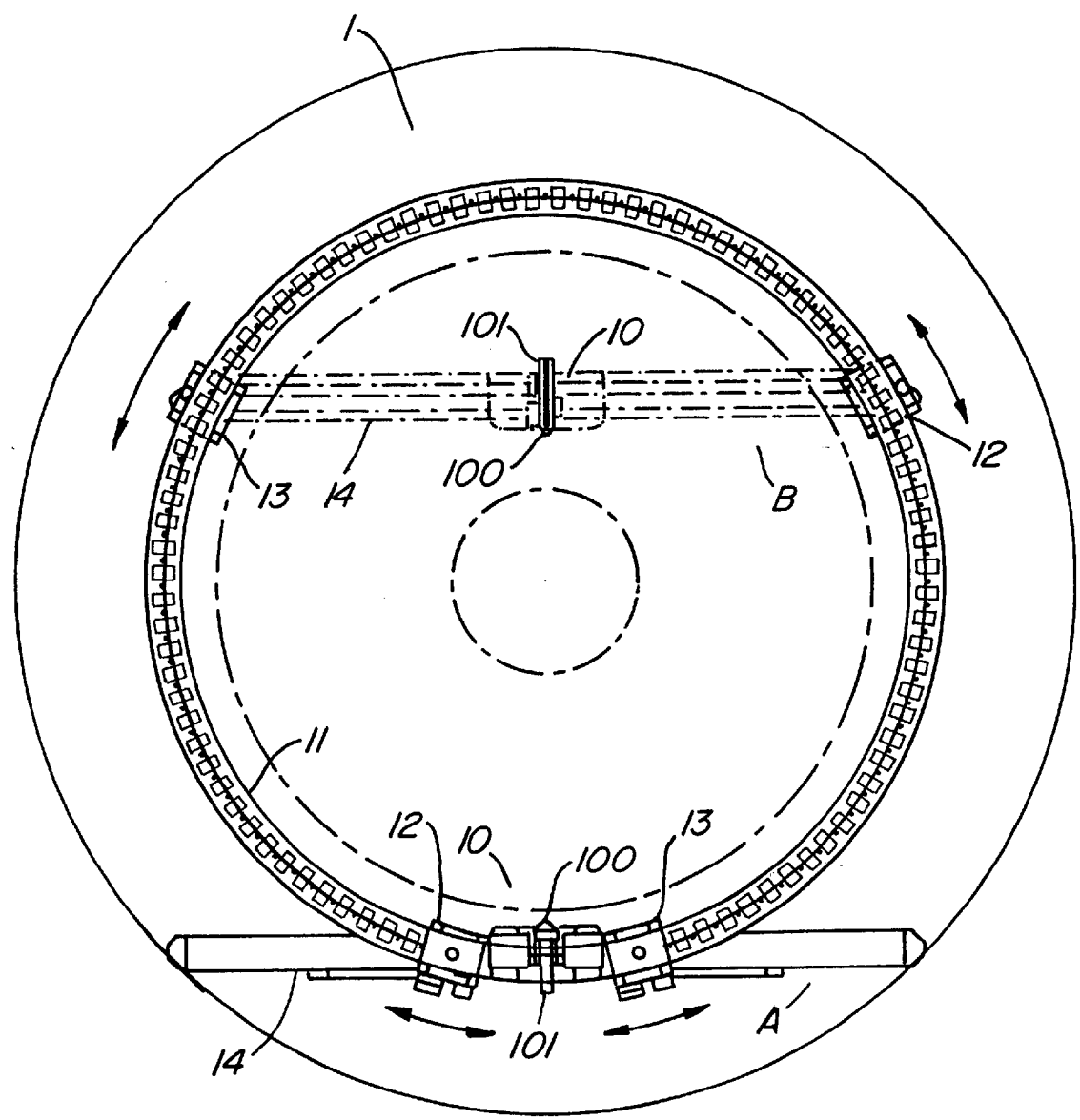
FIG. 2 is the schematic top view of an apparatus for positioning as shown in FIG. 1 and in which the two extreme positions of the crossbeam on the track are illustrated.

In the plan view of FIG. 2, the two extreme positions A and B of the crossbeam 14 on the swivelling bolsters 12, 13 and the track 11 of an apparatus for positioning 1 are shown in schematic form. The fine positioning of the sensing head 100 is effected radially with the arm 101. At the outer extreme position A, the measuring unit moves practically above the track 11, and the crossbeam 14 approximately forms a tangent to the track 11. At the inner extreme position B, the crossbeam 14 forms a chord to the track 11. The crossbeam 14 can naturally assume any intermediate position between the extreme positions A and B.

Figure 3:
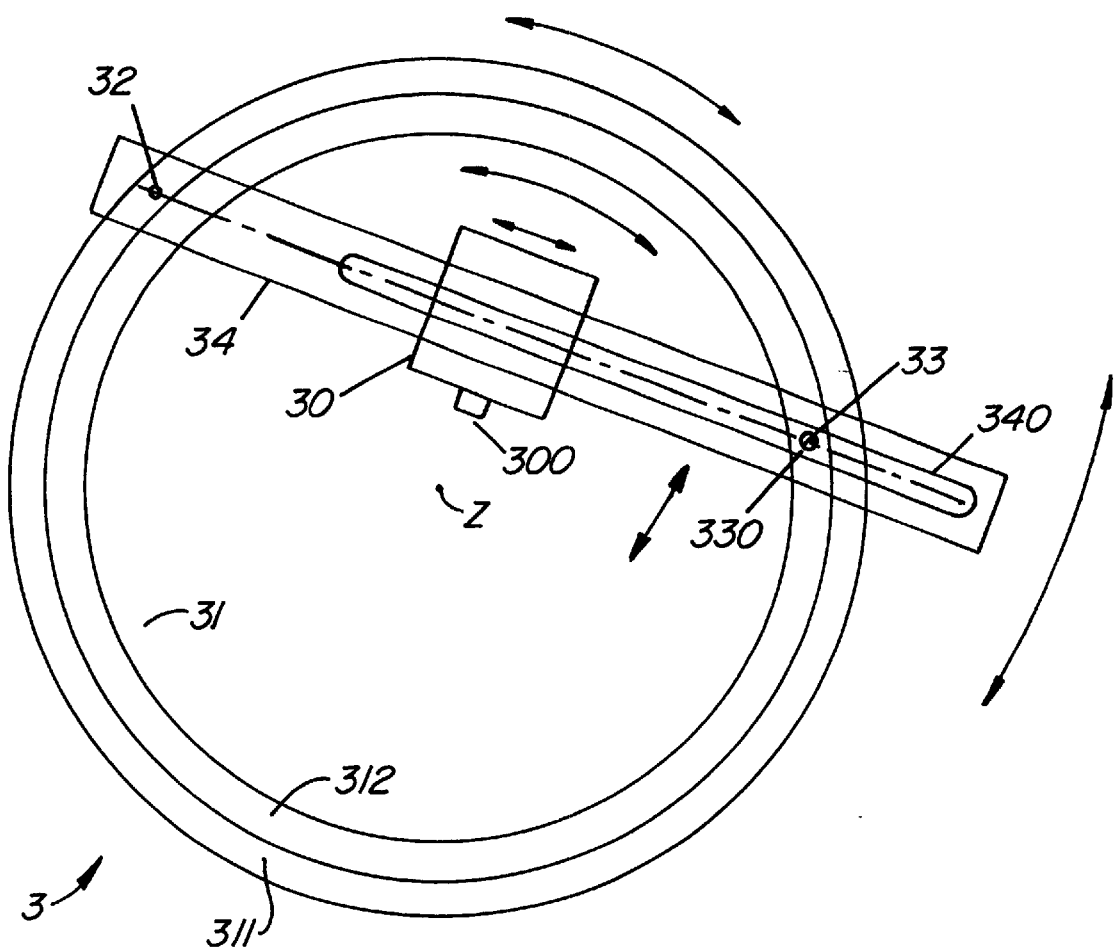
FIG. 3 is the schematic view of an apparatus for positioning in which the track is formed by two concentric rings on which the crossbeam with the measuring unit is arranged.

Finally, FIG. 3 shows a further embodiment of an apparatus for positioning 3 in plan view. The track 31 is here formed by two rings 311 and 312 which can be twisted with respect to one another and turned with one another (tangential arrows). The crossbeam 34 is connected to the pivot bearing 32 on the ring 311 and to the pivot and plain bearing 33 on the ring 312, with the pivot and plain bearing 33 being formed by an elongate groove 340 in which a cam 330 is displaceable in the direction of the longitudinal axis of the crossbeam 34.

If the two rings 211 and 312 of the track 31 are twisted with respect to one another, the crossbeam 34 and so also the measuring unit 30 is positioned radially with respect to the material under test. The measuring unit 30 can be displaceable in the longitudinal direction of the crossbeam 34 in order to be positioned at the center of the chord formed by the crossbeam 34 with the track 31. It could, however, also be provided to turn the measuring unit 30 on the crossbeam 34 towards the center Z of the track 31 in order to align the sensing head 300 of the measuring unit 30 exactly radially. The fine positioning of the sensing head 300 can also be effected here, for example, with an arm (not shown in detail). In operation, the two rings 311 and 312 move synchronously. This apparatus for positioning 3 can also turn in the same direction in operation or turn to and fro around the material under test.

It would also be feasible to support the crossbeam with one pivot and plain bearing each on each ring 311, 312 and thus, for example, to achieve a symmetrical arrangement of the crossbeam with respect to the track 31. The drive of the track 31 and of the rings 311 and 312 can be effected with devices such as are described for the other examples, that is, with electric motors, etc. The transmission of the measuring and control signals can also be effected in the same manner as was described in connection with the other examples.

It is understood that in the apparatus for positioning, devices to fix the adjusted crossbeam in place on the swivelling bolsters can be provided, for example grips actuated by cams, in order to achieve the required measuring accuracy. In this case, for example, only one of the two swivelling bolsters can be driven for the fixing of the rotating speed. The second swivelling bolster can have an asynchronous auxiliary drive in this case.

The synchronous drive, e.g. the drive with a stepping motor, is required in order to achieve a uniform rotating speed and to allow the association of the thickness measurements exactly to a certain position or angular position of the sensing head. This allows the measurement results to be associated with the angular position at the material under test, that is, at the film tube.

In connection with the present invention, the term radial is to be understood such that an exact radial direction is described thereby. A direction can also be understood under the term radial which, seen overall, extends inwardly or outwardly parallel to a radius.

In the examples shown, the swivelling bolsters run on the track and the crossbeams are supported on the swivelling bolsters or on the rings. The measuring unit is also on the crossbeam. This does not necessarily have to be the case even though these embodiments result in advantages. The swivelling bolsters could equally well be made suspended from the track and the crossbeam could equally be hung on this suspended construction. In this case, it could then be of advantage if the track and thus practically the whole apparatus for positioning were suspended, for example, from the ceiling of a room to avoid relatively costly support constructions for the track.

What is claimed is:

1. An apparatus for the positioning of a measuring device having an annular or arcuate track on which the measuring device is supported and for the positioning of the sensing head of the measuring device at a position radial to the track, a crossbeam which supports the measuring device, bearings arranged between the track and the crossbeam and a device for changing the position of the crossbeam with the measuring device in a radial direction to the track with respect to the track, the bearings between the track and the crossbeam being swivelling bolsters which are movable towards one another, away from one another and in the same direction on the track at the same or at different speeds and wherein at least one of the swivelling bolsters is displaceable with respect to the crossbeam.

2. An apparatus in accordance with claim 1, wherein at least one of the swivelling bolsters has a drive motor in order to move the swivelling bolsters and the crossbeam with the measuring device on the track.

3. An apparatus in accordance with claim 1 having an annular or ring segment-like track which has two rings or segments which are displaceable relative to one another by turning and wherein the crossbeam is doubly supported on the track and one each of the bearings is connected to one of the two rings or segments.

4. An apparatus in accordance with claim 1 wherein the measuring device is arranged displaceably in the longitudinal direction of the crossbeam.

5. An apparatus in accordance with claim 1 having a measuring device with a support arm on which the sensing head of the measuring unit is arranged and which is displaceably or telescopically extendable obliquely or transversely to the longitudinal direction of the crossbeam, preferably in a radial direction to the track.

6. An apparatus in accordance with claim 1 having a circular track with a diameter in the range from one to eight meters and a crossbeam with a length in the range from 0.5 to 8 meters.

7. An apparatus in accordance with claim 1 having a measuring unit for measuring the thickness of plastic films and having a measuring system which operates capacitively using a Hall probe or with ionizing radiation, in particular with $\beta$ or $\gamma$ radiation.

8. An apparatus in accordance with claim 1 wherein the transmission of measuring and control signals from and to the measuring unit is effected by modulation onto the supply voltage via the feed line and/or via separate signal lines and/or in a wireless manner.

9. An apparatus in accordance with claim 1 wherein the transmission of the electric feed and of measuring and control signals from and/or to the movable measuring unit is effected at least in part via sliding contacts.

10. An apparatus in accordance with claim 1 having a device which holds the measuring unit in a fixed spatial position on the crossbeam or on the chord formed by the crossbeam with the track, preferably at the center of said chord.

11. An apparatus in accordance with claim 1 wherein each of the swivelling bolsters has one stepping motor each for the drive and a control for the exact independent controlling of the stepping motors, with the same frequency or with different frequencies, and for the moving of the swivelling bolsters or rings in the same direction or in different directions and at the same speed or at different speeds.

12. An apparatus in accordance with claim 1 wherein each of the swivelling bolsters has an asynchronous motor, in particular a linear induction motor or a motor with a friction wheel for the drive, and an arrangement for determining the exact position of the swivelling bolsters on the track and a control for independently controlling the motors with the same frequency or different frequencies and, with the same frequency or with different frequencies, moving the swivelling bolsters or rings in the same direction or in opposite directions and at the same speed or at different speeds.

13. An apparatus for the positioning of a measuring device having an annular or arcuate track on which the measuring device is supported and for the positioning of the sensing head of the measuring device at a position radial to the track, a crossbeam which supports the measuring device, bearings arranged between the track and the crossbeam, a device for the changing of the position of the crossbeam with the measuring device in a radial direction to the track with respect to the track, and an annular or ring segment-like track having two rings or segments which are displaceable relative to one another by turning, wherein the crossbeam is doubly supported on the track and one each of the bearings is connected to one of the two rings or segments.

14. An apparatus in accordance with claim 13 having a device for the synchronous turning of the rings or segments of the track and/or for the synchronous turning or synchronous turning to and fro of the rings with the crossbeam.

15. An apparatus for the positioning of a measuring device having an annular or arcuate track on which the measuring device is supported and for the positioning of the sensing head of the measuring device at a position radial to the track, a crossbeam which supports the measuring device, and swivelling bolsters arranged between the track and the crossbeam and a device for changing of the position of the crossbeam with the measuring device in a radial direction to the track with respect to the track, wherein each of the swivelling bolsters has one stepping motor each for the drive and a control for the exact independent controlling of the stepping motors, with the same frequency or with different frequencies, and for the moving of the swivelling bolsters in the same direction or in different directions and at the same speed or at different speeds.

16. An apparatus for the positioning of a measuring device having an annular or arcuate track on which the measuring device is supported and for the positioning of the sensing head of the measuring device at a position radial to the track, a crossbeam which supports the measuring device, and swivelling bolsters arranged between the track and the crossbeam and a device for the changing of the position of the crossbeam with the measuring device in a radial direction to the track with respect to the track, wherein each of the swivelling bolsters has an asynchronous motor, an arrangement for determining the exact position of the swivelling bolsters on the track, and a control for independently controlling the motors with the same frequency or different frequencies and for moving of the swivelling bolsters in the same direction or in opposite directions and at the same speed or at different speeds.

17. An apparatus for translationally and rotationally mounting a measuring device comprising a peripheral track; a crossbeam traversing the track and mounting a measuring device; and first and second carriages movable along the track and supporting the crossbeam, each carriage including a first bearing permitting relative translational movements between the carriage and the crossbeam, and a second bearing permitting relative pivotal movements between the carriage and the crossbeam so that movement of the carriages along the track in a common direction causes the carriage and therewith the measuring device to move parallel to the track, and movement of the carriages in opposite directions causes movement of the crossbeam and therewith the measuring device in a generally radial direction relative to the track.

* * * * *